United States Patent
Sun et al.

(10) Patent No.: US 7,755,645 B2
(45) Date of Patent: Jul. 13, 2010

(54) OBJECT-BASED IMAGE INPAINTING

(75) Inventors: Xiaoyan Sun, Beijing (CN); Dong Liu, Hefei (CN); Feng Wu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 11/615,537

(22) Filed: Mar. 29, 2007

(65) Prior Publication Data
US 2008/0238942 A1 Oct. 2, 2008

(51) Int. Cl.
G09G 5/00 (2006.01)
(52) U.S. Cl. ........................ 345/634; 345/582; 345/629; 345/639; 382/282; 382/284; 348/590; 348/598
(58) Field of Classification Search ........................ None
See application file for complete search history.

(56) References Cited

U.S. PATENT DOCUMENTS

| | | | |
|---|---|---|---|
| 6,985,263 | B2 | 1/2006 | Georgiev et al. |
| 6,987,520 | B2 | 1/2006 | Criminisi et al. |
| 7,010,163 | B1 | 3/2006 | Weiss |
| 7,012,624 | B2 | 3/2006 | Zhu et al. |
| 7,605,821 | B1 * | 10/2009 | Georgiev ..................... 345/582 |
| 2003/0012453 | A1 | 1/2003 | Kotlikov et al. |
| 2004/0161153 | A1 | 8/2004 | Lindenbaum |
| 2005/0129324 | A1 | 6/2005 | Lemke |
| 2006/0045372 | A1 | 3/2006 | Wang et al. |
| 2006/0233455 | A1 | 10/2006 | Cheng et al. |

OTHER PUBLICATIONS

Bertalmio, et al., "Image Inpainting", available at least as early as <<Nov. 15, 2006>>, at <<http://delivery.acm.org/10.1145/350000/344972/p417-bertalmio.pdf?key1=344972&key2=3987753611&coll=GUIDE&dl=Portal, ACM&CFID=11111111&CFTOKEN=2222222>>, pp. 417-424.

Chan, et al., "Non-Texture Inpainting by Curvature-Driven Diffusions (CDD)", retrieved at <<http://scholar.google.com/url?sa=U&q=http://www.math.umn.edu/~jhshen/Mars/cddinp.ps>>, Journal of Visual Communication and Image Representation, May 19, 2001, pp. 1-16.

Cheung, "Efficient Object-Based Video Inpainting", available at least as early as <<Nov. 15, 2006>>, at <<http:// www.vis.uky.edu/~cheung/doc/icip06A.pdf>>, University of Kentucky, pp. 04.

Pavic, et al., "Interactive Image Completion with Perspective Correction", retrieved at <<http://www-i8.informatik.rwth-aachen.de/uploads/media/PG06_Pavic_iicwpc.pdf>>, Springer-Verlag, 2006, pp. 11.

* cited by examiner

*Primary Examiner*—Antonio A Caschera
(74) *Attorney, Agent, or Firm*—Lee & Hayes, PLLC (57) ABSTRACT

Systems and methods provide object-based image inpainting. The object-based inpainting can recover part of a missing object or can synthesize visual objects that are entirely missing. In one implementation, an exemplary system generates a target visual object to be inpainted into an image, by geometrically matching key features with a model visual object that can be selected from the same or another image. Borders of the target object are refined through pixel-based contour deformation and textures for the target object are obtained either by pixel interpolation or by patch-based modeling of pre-existing texture in the image. Graph-cut segmentation rectifies image overlap as the target object is embedded in the image. Poisson editing filters visual seams, and edge filling completes visual gaps around the border of the target object.

18 Claims, 6 Drawing Sheets

OBJECT-BASED IMAGE INPAINTING

BACKGROUND

Image inpainting, also known as image completion, is a process of filling in missing data in a designated region of an image in a visually plausible manner. Conventionally, image inpainting has been performed by professional artists. With the rapid development of digital techniques, image inpainting has become a challenging research area in computer graphics and computer vision. Numerous interesting applications, from image restoration to object removal/replacement, have arisen. Many image rendering techniques, such as image filtering, sketch reality, and texture synthesis can be readily employed in image inpainting to recover the unknown regions with available information from their surroundings.

Image inpainting has attracted a lot of attention since it was introduced in the year 2000. Texture synthesis techniques are widely utilized in image inpainting to fill in regions that have textures that are homogenous with their surroundings. Some schemes synthesize at the pixel level while other approaches, such as image quilting, texture sampling, graph-cut techniques, and texture optimization, perform at a patch level. What these techniques have in common is that they work well for propagating a texture when little structural information exists in the unknown region, yet each has difficulties in reserving salient structure.

Partial differential equation (PDE)-based schemes fill in missing regions of an image by smoothly propagating image Laplacians in the isophote direction from the exterior. Exponential family distribution is used to model the image and the holes are filled in from the boundaries. Some schemes replace missing areas by interpolation guided by the estimated edge information. These pixel-based approaches produce good results for small flaws and thin structures. However, large-scale missing regions are still a challenging problem in such schemes.

Recently, patch-based approaches have been proposed for image inpainting by augmenting texture synthesis with certain automatic guidance. This preserves better edge sharpness and structure continuity. The recovery of the unknown region is gradually completed by a composition of circular known patches guided by a smooth approximation. A best-first algorithm imposes higher priorities on pixels lying in neighborhoods of edges before a restoration is performed according to the priority order at patch level. Additionally, the methods—pixel-based inpainting and patch-based synthesis—are integrated to suit different local characteristics. They are therefore capable of propagating both regular (linear or simple curvilinear) structures as well as 2-dimensional texture into the unknown regions.

Moreover, interactive guidance has been used to further improve inpainting capability by indicating the source region, depth information, and important salient structure. With high-level knowledge employed, these approaches can produce good results for certain challenging images. However, it is still difficult for such inpainting schemes to complete areas that feature complex and even semantic structures, especially in instances that have irregular structure or in which the majority or entire object is missing.

SUMMARY

Systems and methods provide object-based image inpainting. The object-based inpainting can recover part of a missing object or can synthesize visual objects that are entirely missing. In one implementation, an exemplary system generates a target visual object to be inpainted into an image, by geometrically matching key features with a model visual object that can be selected from the same or another image. Borders of the target object are refined through pixel-based contour deformation and textures for the target object are obtained either by pixel interpolation or by patch-based modeling of pre-existing texture in the image. Graph-cut segmentation rectifies image overlap as the target object is embedded in the image. Poisson editing filters visual seams, and edge filling completes visual gaps around the border of the target object.

This summary is provided to introduce object-based inpainting, which is further described below in the Detailed Description. This summary is not intended to identify essential features of the claimed subject matter, nor is it intended for use in determining the scope of the claimed subject matter.

DETAILED DESCRIPTION

Overview

Described herein are systems and methods for object-based inpainting. The exemplary object-based inpainting can fill in missing areas in an image that features complex and even semantic structures, even in regions with irregular structure or in which the majority or the entire object is missing. Exemplary object-based inpainting solves conventional problems in image inpainting by changing the granularity of fill-in operations from the more microscopic level of structure and texture to the more macroscopic level of object and sub-object. Thus, object-based image inpainting is able to recover images in which a missing region is supposed to include an entire missing object or part of that object. Exemplary techniques may make use of homogenous "model" objects derived from the current image or even other images. The object-based inpainting is described in terms of image recovery, but can also be applied to image editing, image compression, and other image-processing operations.

The term "object" is used herein to represent relatively high-level image elements that include both salient structure and specific texture. One feature of the exemplary object-based inpainting is that it uses similarity between these relatively high-level objects—i.e., can use an existing object as a model—rather than pixels or patches for image restoration. This helps in complicated scenarios that remain a challenge to conventional state-of-the-art techniques. It can usually be assumed that there exists a similar object to the unknown or missing object to be inpainted in a known region of the image or in other images close at hand. Otherwise, if there is truly no model object available, the missing region is synthesized by conventional techniques. But a model object having similar features is often available for producing the missing object. Then, the model object—or "source" object—is designated as such, and the unknown object and/or the missing region of the image are designated automatically or by the user as the target of the object-based inpainting.

Exemplary System

Figure 1:
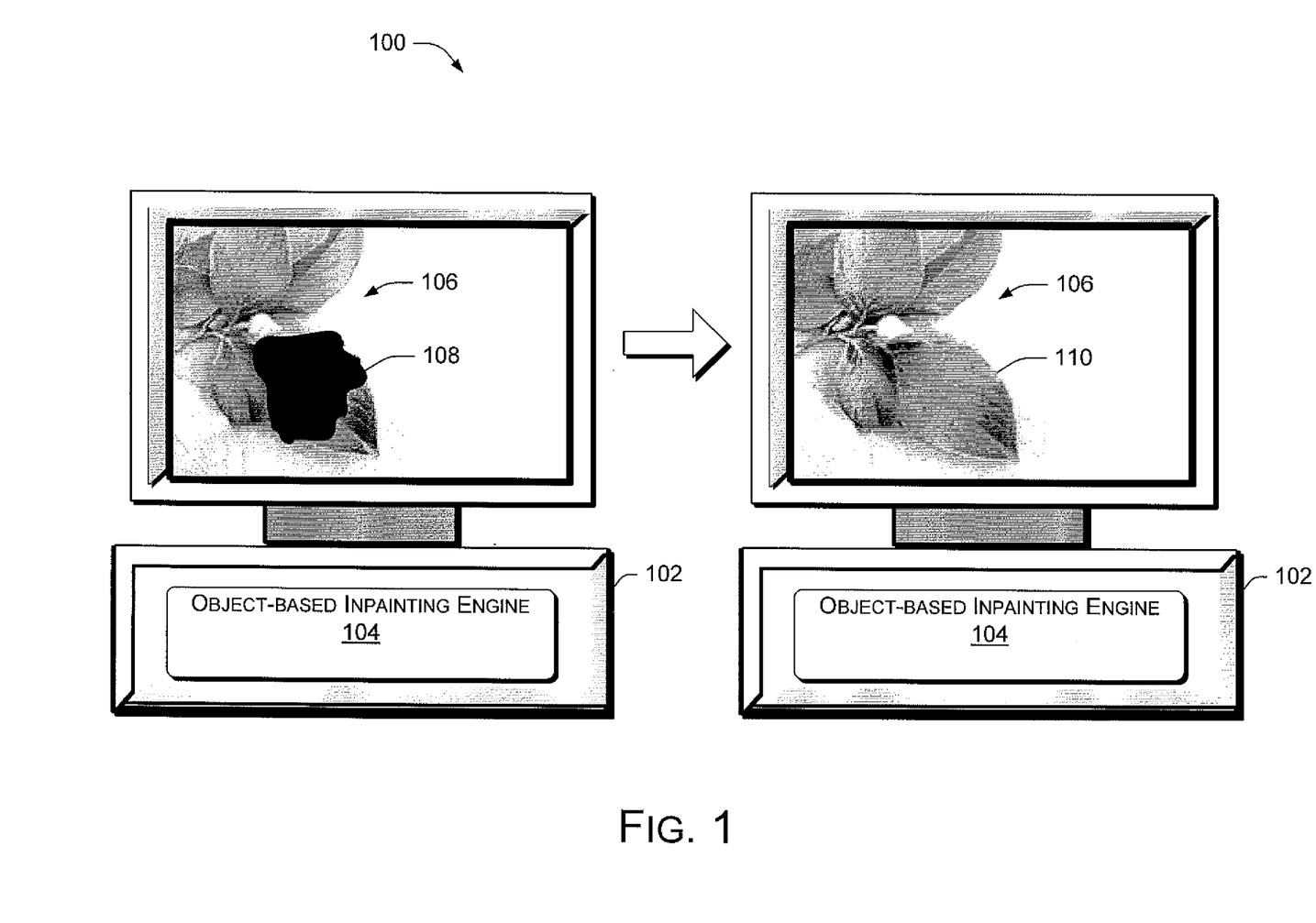
FIG. 1 is a diagram of an exemplary object-based image inpainting system.

FIG. 1 shows an exemplary object-based image inpainting system 100. A computing device 102 hosts an exemplary object-based inpainting engine 104. For an image 106 that has a missing (unknown, corrupted, etc.) region 108, the exemplary object-based inpainting engine 104 inpaints one or more objects in the missing region 108 based on object-level information available in the rest of the image 106 or available in a similar image obtainable from a database, library, Internet, etc.

In FIG. 1, the missing region 108 contains part of a leaf image, and since the remainder of the image 106 includes other instances of similar leaf objects, the exemplary object-based inpainting engine 104 can abstract structure information (e.g., the object's border or outline information) and texture information from the pre-existing leaf objects in the image 106. In one implementation, the object-based inpainting engine 104 then creates an initial coarse object that serves as a starting point for creating a final refined version of the object 110 that will be inpainted in the missing region 108.

Exemplary Engine

Figure 2:
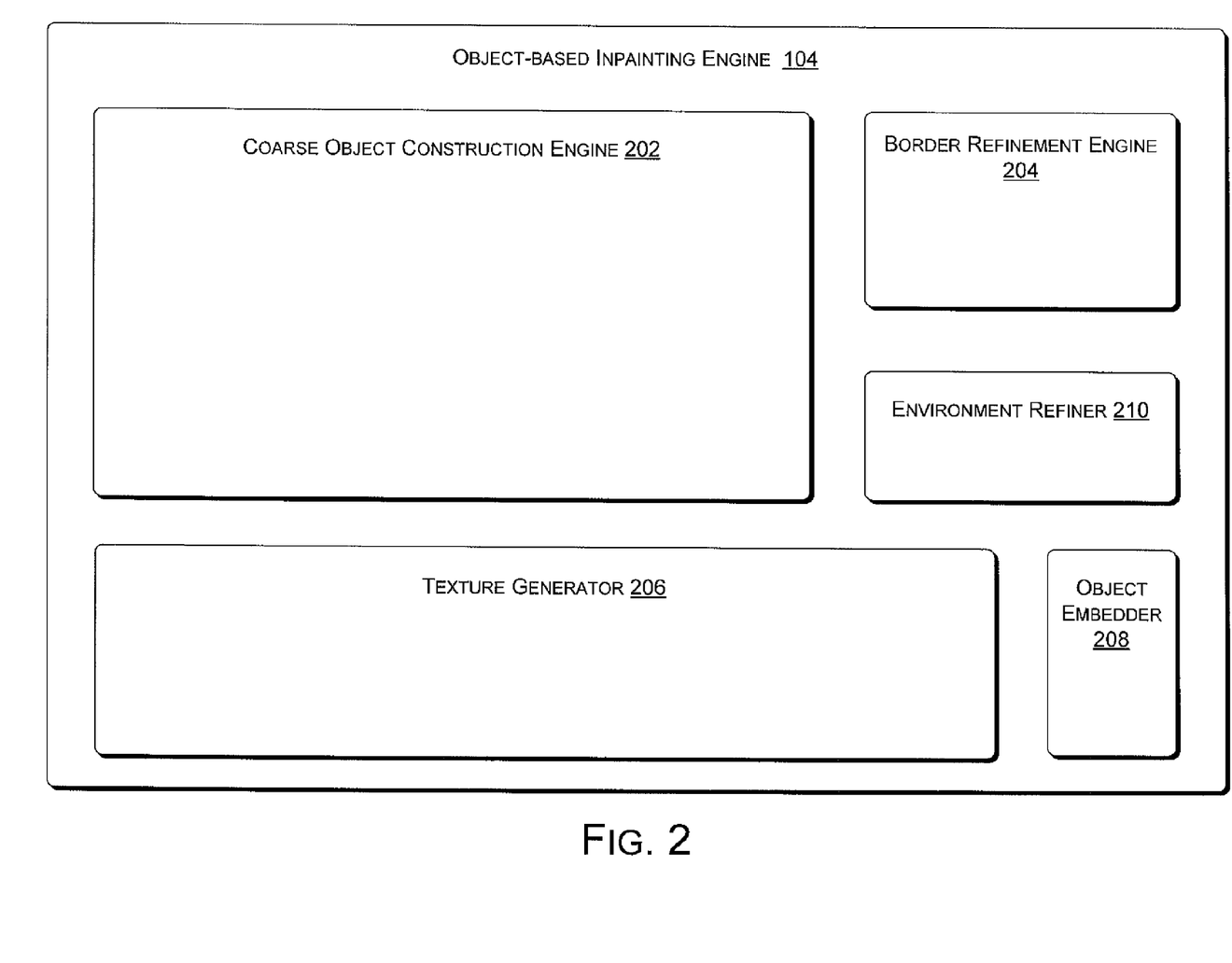
FIG. 2 is a block diagram of an exemplary object-based inpainting engine.

FIG. 2 shows the exemplary object-based inpainting engine 104 of FIG. 1 in greater detail. FIG. 2 introduces exemplary main components of one implementation of the object-based inpainting engine 104, thereby introducing an even more detailed description to be presented in FIG. 3. The illustrated implementation in FIG. 2 is only one example configuration, for descriptive purposes. Many other arrangements of the illustrated components or even different components constituting an exemplary object-based inpainting engine 104 are possible within the scope of the subject matter. Such an exemplary object-based inpainting engine 104 can be executed in hardware, software, or combinations of hardware, software, firmware, etc.

The illustrated object-based inpainting engine 104 includes a course object construction engine 202, a border refinement engine 204, a texture generator 206, an object embedder 208, and an environment refiner 210. In one implementation, the course object construction engine 202 matches key features of a designated source object—the model—with an "object-under-construction" in order to obtain a rough basic outline or border of the object being inpainted. Inner structure, such as the vein system of a leaf, may also be generated at this stage—e.g., as a "type" of texture. The border refinement engine 204 warps the contours of the roughed-in border to a more realistic and nuanced shape. The texture generator 206 then synthesizes or applies texture to the object-under-construction with regard for the border and inner structure already roughed-in, so that the texture appears to naturally follow 3-dimensional variations in the object. The object embedder 208 situates the newly inpainted object into the entire scenic context of the image 106. The environment refiner 210 rectifies overlaps that occur between the object being inpainted and the pre-existing background; and also synthesizes texture to fill in gaps around relatively small object(s) being inpainted into a larger designated missing region 108. Other arrangements of components can also be employed to perform the exemplary object-based inpainting. The exemplary engine 104 shown in FIG. 2, will now be described in greater detail in FIG. 3.

Figure 3:
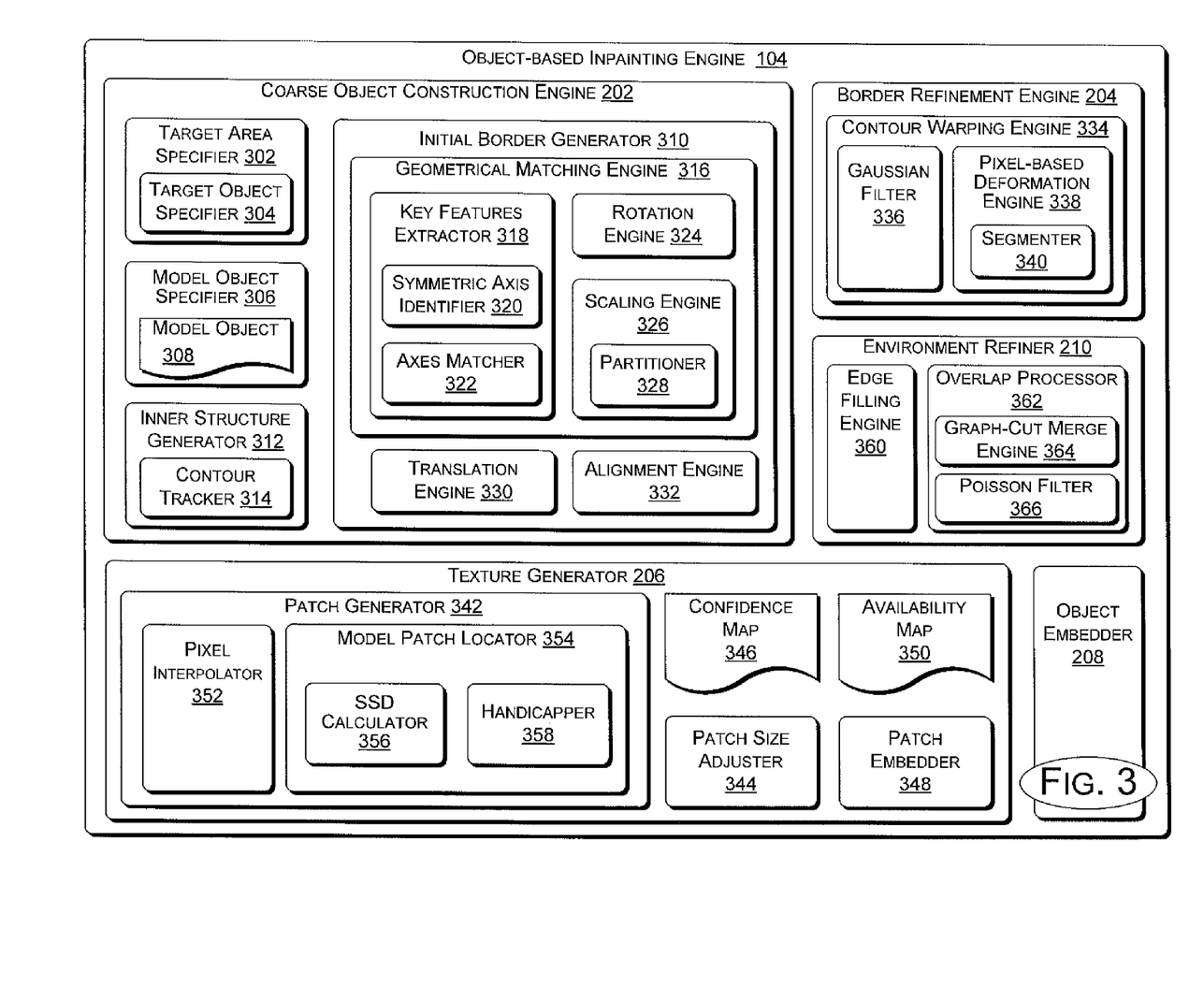
FIG. 3 is a block diagram of the exemplary object-based inpainting engine of FIG. 2, in greater detail.

FIG. 3 shows the exemplary object-based inpainting engine 104 of FIG. 2, in greater detail. The illustrated implementation is only one example configuration, for descriptive purposes. Many other arrangements of the illustrated components or even different components constituting an exemplary object-based inpainting engine 104 are possible within the scope of the subject matter Such an exemplary object-based inpainting engine 104 can be executed in hardware, software, or combinations of hardware, software, firmware, etc.

In the illustrated object-based inpainting engine 104 of FIG. 3, the coarse object construction engine 202 includes a target area specifier 302 and a target object specifier 304; and includes a model object specifier 306 and may include a buffer for storing the model object 308 or related information.

The coarse object construction engine 202 also includes an initial border generator 310 and an inner structure generator 312 with a contour tracker 314. The initial border generator 310 includes a geometrical matching engine 316. The geometrical matching engine 316 includes a key features extractor 318, a symmetric axis identifier 320, an axes matcher 322, a rotation engine 324, and a scaling engine 326 that may further include a partitioner 328. The initial border generator 310 also includes a translation engine 330, and an alignment engine 332.

The border refinement engine 204 includes a contour warping engine 334, which may further include a Gaussian filter 336, a pixel-based deformation engine 338, and a segmenter 340.

In one implementation, the texture generator 206 includes a patch generator 342, a patch size adjuster 344, a confidence map 346, a patch embedder 348, and an availability map 350. The patch generator 342 further includes a pixel interpolator 352 and a model patch locator 354, that may further include a sum of squared difference (SSD) calculator 356 and a pixel handicapper 358, for situations in which the pixels for a patch of texture include border pixels.

The environment refiner 210 may further include an edge filling engine 360 and an overlap processor 362 that includes a graph-cut merge engine 364 and a Poisson filter 366. The interrelation of the above-introduced components and their function will now be described in greater detail.

Operation of the Exemplary Engine

Figure 4:
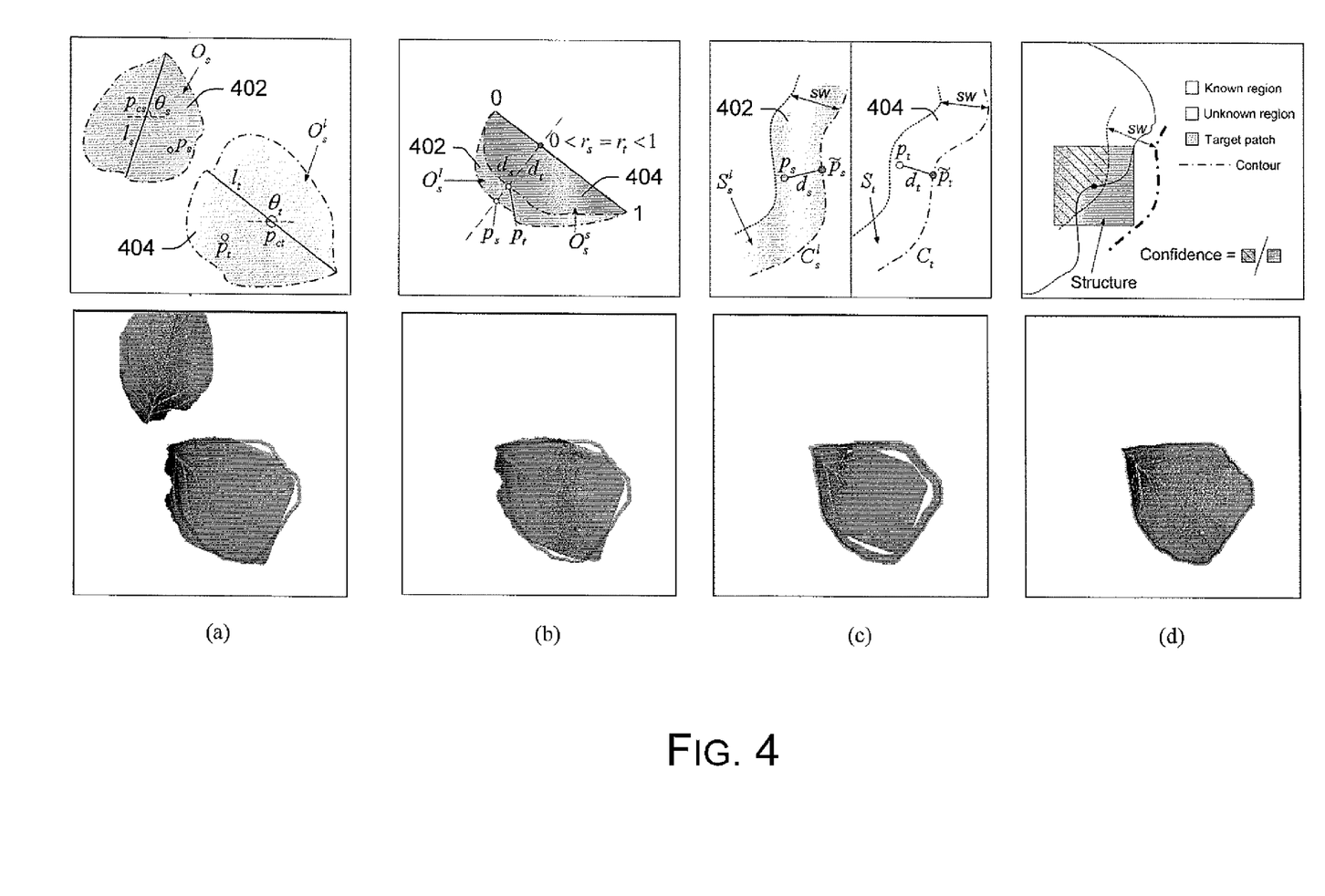
FIG. 4 is a diagram of various aspects of exemplary object-based inpainting.

FIG. 4 shows elements of the exemplary object-based image inpainting process. The top horizontal line of figures provides schematics and the bottom horizontal line of figures provides corresponding illustrative examples. Column (a) shows axis matching; column (b) shows axis-based scaling; column (e) shows border deformation; and column (d) shows texture synthesis. In columns (a), (b), and (c), which include the source object 402 and the target object 404, contours of objects are denoted as dash-dot lines in the first horizontal row and thickened lines in the second horizontal row.

Object inpainting is different from conventional inpainting techniques because of the following features of a visual object: 1) typically, the visual object is a well-organized representation of structure and texture, and both elements play a part in object inpainting operations; 2) structures are similar among a species of object, but the unique features of any individual member of the species should be embodied by the exemplary object inpainting; 3) in a visual object, texture has a tight relationship with structure and with relative position while randomly synthesized texture of conventional inpainting looks unnatural in an object-based inpainting context.

In one implementation, the object-based inpainting engine 104 proceeds in three steps after the target object specifier 304 and the model object specifier 306 have selected target and source objects. The target area specifier 302 can specify an area of the image 106 to inpaint, the specified area containing none, one, or more-than-one missing visual object(s) to be inpainted. When part of an object is missing and part visible, the target object specifier 304 allows the user to designate the object to be completed via recovery by inpainting. In one implementation, the target object specifier 304 can also allow the user to manually specify an arbitrary figure or outline of the target object, thus providing a creative stage for users.

In a first step, the geometrical matching engine 316 roughly matches the source object and the target object based on some key features by 2-dimensional geometric operations such as translation, rotation, scaling, and alignment. In a second step, the border refinement engine 204 warps the structure (e.g., the exterior border) of the target object from that of the source object to that of the new target object. In the third step, the texture generator 206 creates and/or restores the inner attached texture and then the resulting target object is merged into the image. The following description uses a visual example of an image 106 depicting leaves, as shown in FIG. 1, to illustrate the operations.

Initial Border Generation

The geometrical matching engine 316 performs geometric matching between source and target objects based on some key features. The key features extractor 318 may use some key features for matching that are known a priori, i.e., the key features may be application-dependent characteristics. For example, an application that deals exclusively with imaging fish can exploit the key features of an expected fish shape and symmetry. In some cases, dominant features of an object exist that can be automatically extracted. Physical examples include the main nervations of a leaf, the symmetrical axis of a flower petal or a butterfly, and so forth. In other cases, more complicated processes may be uses to achieve key features to match between objects, and even a type of key feature selection that depends on human vision and/or knowledge can be used.

Since many objects have symmetrical features, the symmetric axis identifier 320 can select such an axis as a dominant key feature for a species of objects, such as leaves and many other living things and natural settings that may possess symmetry around a line. In the case of synthesizing a leaf object by inpainting, the symmetric axis identifier 320 can achieve the main symmetric axis by calculating the weight center of the object, searching lines that pass through the weight center and that separate the object into two partitions, and selecting one line as a main axis based on its length as well as its relative position. In a majority of cases, the direction of the main symmetric axis can be correctly determined by the geometric shape of the object. The symmetric axis identifier 320 can also determine the main axis through interaction or user input.

Based on the main axis extracted by the key features extractor 318, geometrical matching may be accomplished in two steps. In a first step, the axes matcher 322 matches the two objects, source object ($O_s$) and target object ($O_t$), according to the axis. Then, orientation and size of the target object (so that it is appropriate for the designated missing area 108) are achieved by the rotation engine 324, scaling engine 326, translation engine 330, and alignment engine 332. The inner structure generator 312 assembles the inner texture (e.g., leaf nervation) from source to target according to the contours of the target object with respect to the corresponding axes determined by the contour tracker 314.

Regarding the symmetric axis identifier 320, three parameters can be used to describe an axis, i.e., obliquity θ, e.g., in an anticlockwise direction, center point $p_c$, and length l, as shown in FIG. 4(a). Thus, for each pixel $p_s \in O_s$, the reconstructed $p_t \in O_t$, is obtained by the axes matcher 322 as in Equation (1):

$$\begin{pmatrix} p_t.x - p_{ct}.x \\ p_t.y - p_{ct}.y \end{pmatrix} = f_l \begin{pmatrix} \cos\delta & -\sin\delta \\ \sin\delta & \cos\delta \end{pmatrix} \begin{pmatrix} p_s.x - p_{cs}.x \\ p_s.y - p_{cs}.y \end{pmatrix} \quad (1)$$

where $f_l = l_t/l_s$ is the length scaling factor; $\delta = \theta_t - \theta_s$ is the rotated angle; and $p_{cs}$ and $p_{ct}$ are center points of source axis and target axis, respectively. In this manner, the rotation engine 324, scaling engine 326, translation engine 330, and alignment engine 332 rotate, scale, and translate the source object to a new location, resulting in $O_s^1$, which is aligned with the target object $O_t$ with respect to axis.

Consequently, the scaling engine 326 scales $O_s^1$ along the vertical direction of the main axis. The partitioner 328 can independently scale the two partitions of $O_s^1$ that are separated by the main axis. For each partition of $O_s^1$ ($O_t$), the distances from each pixel in the contour to the axis of the target object are averaged to calculate the mean width $w_s^t$ ($w_t$), and then the width scaling factor of the partition $f_w$ is found by $f_w = w_t / w_s^t$.

If $f_w$ is larger than a threshold k ($k \geq 1.0$), then the current partition should be magnified to a larger scale. However, in many cases the scaling up operation leads to an unnatural border as well as an undesirably smoothed or blurred inner texture. Thus, the initial border generator 310 tries to avoid large-scale magnification.

Otherwise, the scaling engine 326 shrinks the current partition of $O_s^1$, resulting in $O_s^s$ roughly fitting into the shape of the target object when $f_w$ is less than k. Different re-sampling methods can be adopted in the object-based inpainting engine 104. For example, a relatively simple scaling method can be utilized. In detail, each pixel in $O_s^s$ can be copied from the matching pixel in $O_s^1$ which satisfies the following constraints:

$$d_t = f_w \cdot d_s \text{ and } r_t = r_s \quad (2)$$

where, as illustrated in FIG. 4(b), $d_t$ and $d_s$ are distances from the target pixel and corresponding source pixel to the axis, respectively; and $r_t$ and $r_s$ indicate normalized relative positions of their perpendicular roots on the axis.

Usually, the object embedder 208 embeds the source object into the target position with well-kept texture after the geometrical matching. At this point in the operations, the generated target object can be treated as the final result of the exemplary object inpainting if there are no other target features that need to be satisfied. For example, if the target object is totally unknown from the outset or if it is just imaginary, then further refinement may not be of much use. Otherwise, the following stages can be performed to make the rendered object even more visually desirable.

Border Refinement

The contour warping engine 334 uses contour deformation to refine the border of the target object. Structure is regarded herein as a mid-level representation of primitives that have specific shape, variable width, and/or photometric attributes. Since it is a fuzzy logic problem to distinguish structure and texture even with human vision, in one implementation the object border is selected as structure, and inner structure or framework, such as leaf nervation, is regarded as texture. When an implementation of the object-based inpainting engine 104 includes a capacity to perform more precise segmentation of inner structure, then the texture generator 206 can delicately perform structure deformation to produce more diverse objects. In many implementations, the texture generator 206 affords the border the highest priority in structure deformation used for border refinement.

As shown in FIG. 4(c), contour represents the outskirts of an object (denoted by C while structure means region S with a width of sw along the contour of the object. Before the deformation performed by the pixel-based deformation engine 338, the Gaussian filter 336 smoothes the contours of both $O_s^l$ and $O_t$ to decrease noise. Compliant with the axes-identifying and matching functions of the geometrical matching engine 316, the segmenter 340 divides the border structure of target object $O_t$ into two segments, divided by the main axis. Each segment $S_t$ with a fraction of the entire contour $C_t$, is restored from its counterpart segment $S_s^l$ that has contour $C_s^l$ in the source object $O_s^l$. It is the smoothed contour of $O_s^l$ that is used in the contour deformation rather than that of the shrunken version $O_s^s$ since the latter already has a distorted version of the border.

The pixel-based deformation engine 338 performs the contour warping at a pixel level. As shown in FIG. 4(c), given a pixel $p_s \in S_s^l$, the pixel $p_t \in S_t$ is recovered from $p_s$ subject to $$d_t = d_s \text{ and } r_t = r_s \qquad (3)$$

where, if $\tilde{p}_s$ denotes the nearest pixel in $C_s^l$ to $p_s$, then $r_s$ indicates the normalized relative position of $\tilde{p}_s$ with respect to the main axis, and $d_s$ gives the distance between $\tilde{p}_s$ and $p_s$. The terms $r_t$ and $d_t$ have similar meanings. In this manner, all segments of the structure of target object $O_t$ are filled in from that of the source object $O_s^l$.

In one implementation, the operation of the pixel-based deformation engine 338 is relatively simple. Experimental results have demonstrated its effectiveness. A pixel-based engine 338 is used since it is much more capable than patch-based engines for recovering thin structure. Relative position is employed as a qualified indicator for pixel matching especially when the structure is spatially varied. Distance information, as is typical, plays an important role in deformation because it represents photometric attributes such as contrast and blurring along structure normal. In one implementation, the segmenter 340 divides the structure into two segments. In other implementations, the segmenter 340 divides structure into additional parts, as it is more promising to synthesize complicated structure when it is segmented into additional parts based on other approaches, such as multi-scale convex/concave matching.

Texture Synthesis

The coarse object construction engine 202 and the border refinement engine 204 readily generate the structure and main body of the target object. The target object is mostly rendered at this point, but still has some unknown regions between the main body and border. The texture generator 206 performs texture synthesis to fill in these holes.

In one implementation, the texture generator 206 adopts a patch-based technique that is similar to J. Sun, L. Yuan, J. Jia, and H.-Y. Shum, "Image completion with structure propagation," ACM Trans. Graph. 24, 3, Proc. ACM SIGGRAPH 2005, 861-868, (the "Sun reference," incorporated herein by reference), with some details of this technique adapted for the exemplary object-based inpainting engine 104. In one implementation, the texture generator 206 employs square patches as the fundamental texture element while the confidence map 346 guides the order of synthesis and the availability map 350 is constructed to limit the range of candidate patches.

The texture generator 206 restores holes that remain in the target object by first reconstructing the significant patches and then the others that remain. The significance of a patch is determined by a confidence calculation, as shown in FIG. 4(d). For each patch centered at a marginal pixel of an unknown region, a known pixel ratio is regarded as the confidence factor. In one scenario, known pixels belonging to the border (i.e., the structure) are not counted in the confidence computation. Accordingly, the patch generator 342 synthesizes the patch with the highest confidence rating first.

The patch size adjuster 344 dynamically adjusts the size of a selected patch to maximize confidence, which also provides diversity in different scales of texture patches. Given a n×n patch centered at edge pixel p, the confidence of the patch is P(n). Then, the patch size adjuster 344 performs the adjustment on the patch size as follows:

Dynamic Patch Size Adjustment:

```
initial patch size n=InitSize;
while(n≦MaxSize)do
    if(p(n)<p(n+1))
        n=n+1;
    end if;
end while;
if(n==InitSize)
    while(Minsize ≦ n)do
        if(p(n)<p(n-1))
            n=n-1;
        end if;
    end while;
end if;
```

The patch size adjuster 344 determines patch size as the patch synthesis is processing. If the unknown region in the target patch is small enough, the pixel interpolator 352 can fill in these pixels by interpolation with their neighbor pixels. Otherwise, the model patch locator 354 traverses the neighboring area adjacent to a target patch to find a similar patch from some known part. The SSD calculator 356 measures the similarity of these two patches by the sum of squared difference (SSD) of pixel values between overlapped known regions of two patches. The handicapper 358 attenuates the SSD between two pixels by an attenuation factor $\lambda_s$ ($\lambda_s > 1.0$) if either of them belongs to the structure (e.g., the border). In this manner, the possibility of using structure pixels to fill in texture is greatly reduced. Typically the structure regions have different statistical characteristics from that of textured regions. Since the structure has already been generated by the contour deformation implemented by the border refinement engine 204, the texture generator 206 typically aims to prevent the known structure from interfering with texture to be generated during texture synthesis. Therefore, in one implementation, the confidence map 346 is so computed that there is a bias in favor of the patches that do not contain structure pixels. Thus, the dynamic adjustments of the patch size adjuster 344 lead to smaller patch sizes for patches that are to be used near border or inner structure. Furthermore, the attenuation factor $\lambda_s$ emphasizes that the source patch being used as the raw starting texture should be selected from a textured region of the source object and not a region that contains structure.

Finally, the known patch that results in the least SSD is selected as the candidate source patch. The filling-in process carried out by the patch embedder 348 is not as simple as just copy-paste work. The patch embedder 348 has to deal with, or may cause, overlapped regions as well as seams. But the environment refiner 210 can solve these problems by implementing weighted averaging or graph-cut techniques.

After the patch with highest confidence is restored, the confidence map 346 is updated. All newly recovered pixels are treated as known pixels in the succeeding synthesis steps. Then, the patch generator 342 searches for the next target patch until no unknown pixels exist.

Image Completion with Object Inpainting

Figure 5:
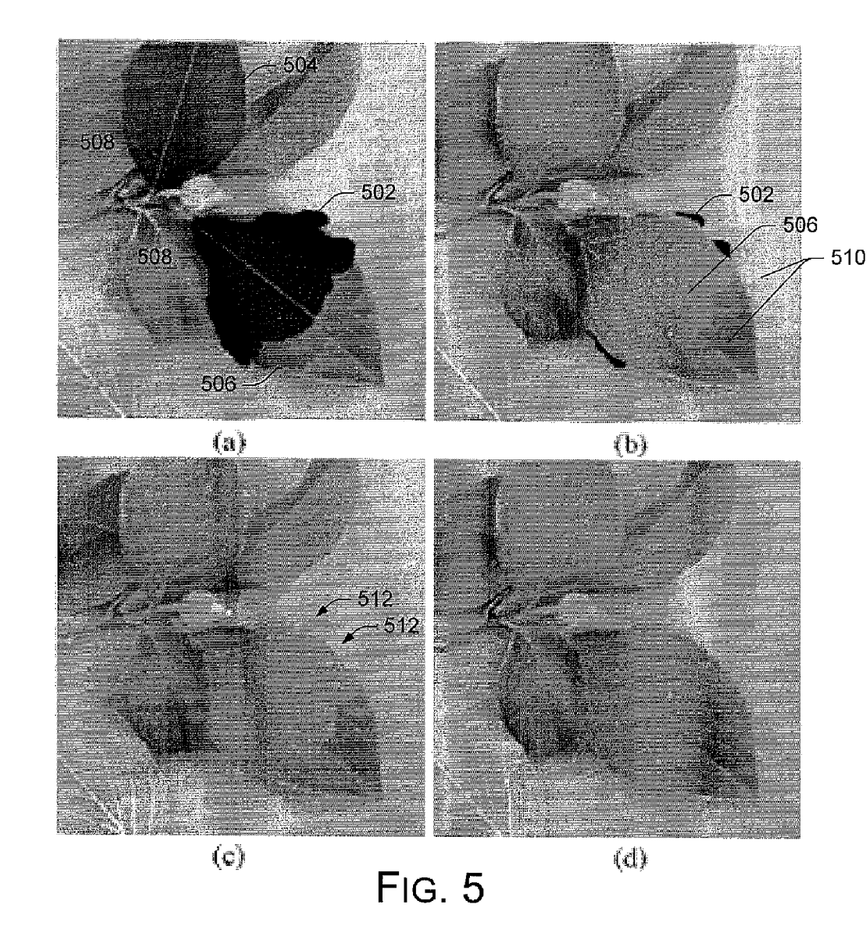
FIG. 5 is a diagram of various visual results of exemplary object-based inpainting.

Given the source and target objects selected by the model object specifier 306 and the target object specifier 304, the exemplary object-based inpainting engine 104 renders target objects one by one. The texture generator 206 fills in remaining unknown regions using the above-described texture synthesis. Then the environmental refiner 210 adds the finishing touches by finalizing the visual interface between the pre-existing image and the target object being newly inpainted. FIG. 5 shows some details of the exemplary environmental refinement. First, FIG. 5(a) shows the designated target area 502 ("unknown region") in black; the source object 504; and the target object 506 that have been specified (e.g., by the user), and their main axes 508. FIG. 5(b) shows a graph-cut merging result of the rendered target object 506 and existing image 510; FIG. 5(c) shows an inpainting result after exemplary edge filling 512 in other unknown regions outside the object by texture synthesis; and FIG. 5(d) shows a final result after Poisson filtering and/or editing.

If there is salient structure outside the target objects as shown in FIG. 5, certain structure propagation methods, such as described in the Sun reference cited above, can be included in an implementation of the exemplary object-based inpainting engine 104. The edge filling engine 360 can propagate surrounding texture into gaps around target objects that are too small to fill the designated unknown region 108. In one implementation, the edge filling engine 360 uses pixel-based inpainting to fill in gaps surrounding an exemplary inpainted object. A At the target area specifier 302, since the region of the target object is specified by the user based on semantic understanding, it may overlap with the known (pre-existing) image in the scenario where parts of the target object are larger than the designated missing area 108. The graph-cut merge engine 364 deals with this overlap problem. The graph-cut merge engine 364 performs a graph-cut segmentation to differentiate foreground—the target object—and background (the pre-existing image). Then the graph-cut merge engine 364 places the target object "on top" of the background, so that the target object borders and the image contents they contain take precedence over portions of overlapping background.

Seams may still be visible due to the photometric variation between different objects, background, etc. The Poisson filter 366 aims to remove such seams. Such Poisson editing modifies the image region by filtering to make its gradient distribution follow a given gradient field. In one implementation, the gradient field $\nabla f^*$ is constructed separately for each color channel, red-green-blue (R/G/B), with regard to that of the original signal $\nabla f$ by Equation (4):

$$\nabla f^*(p) = \begin{cases} 0 & \text{if } p \in \partial\Omega \\ \nabla f(p) & \text{otherwise} \end{cases} \quad (4)$$

where $\partial\Omega$ indicates the seams that are caused by the graph-cut merge engine 364, i.e., the seams between existing image region and generated image region. The Poisson filter 366 erases seams since gradients are forced to zero, and the inner region of the target object can also be filtered to be merged with the outer region. The generated or restored image appears much more natural to the human eye after editing via the Poisson filter 366.

Exemplary Methods

Figure 6:
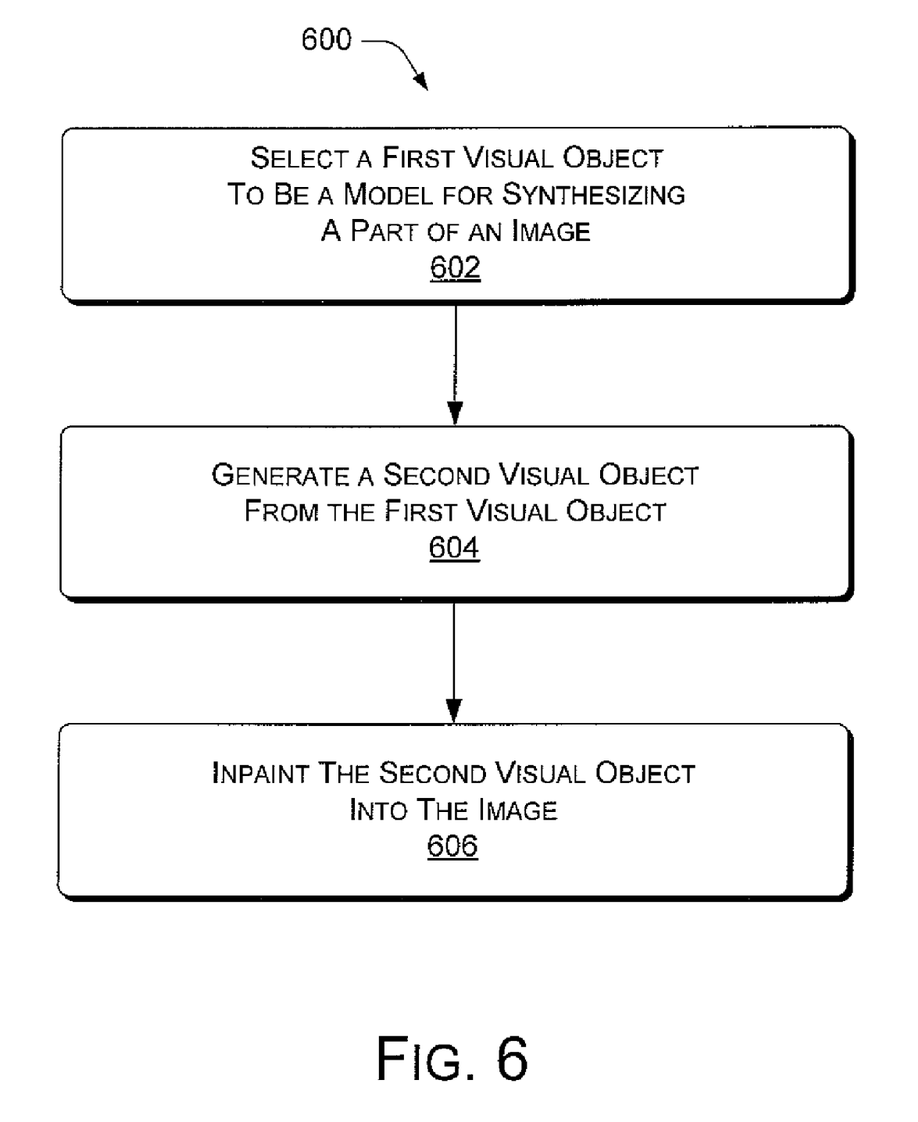
FIG. 6 is a flow diagram of an exemplary method of object-based inpainting.

FIG. 6 shows an exemplary method 600 of performing object-based inpainting. In the flow diagram, the operations are summarized in individual blocks. The exemplary method 600 may be performed by hardware, software, or combinations of hardware, software, firmware, etc., for example, by components of the exemplary object-based inpainting engine 104.

At block 602, a first visual object is selected to be a model for synthesizing part of an image. Selection of the model "source" object may be performed manually by a user or can be done automatically by recognizing object shapes to be propagated in an image. For example, in an image of a tree, in which part of the tree is missing, a branch may be selected as a model object for synthesizing missing branches, and a leaf may be selected as a model object for synthesizing missing leaves. The size and orientation of the selected model object does not matter, because the exemplary method 600 can size and orient the generated objects.

At block 604, a second visual object is generated from the first visual object. Rather than just clone the model object and proceed to a cut-and-paste operation, geometrical matching is performed between the selected model object and a tentative target object. Axes of symmetry may be identified and matched across objects. The generic essence of a visual object's species is captured, while the particular unique characteristics of any individual instance within the species are generated for that individual. Thus, in the example of object-inpainting an image of a tree in which part of the tree is missing, the recovered parts of the image will have branches and leaves that fit in with the rest of the tree, but that do not look exactly like any of the other branches and trees. Each synthesized object that is inpainted is generated anew and has its own unique appearance. Contour warping and custom texturing give each inpainted object unique shape, size, textured surface, etc., while adhering to the general theme of the selected model object. It should be noted that the model object does not have to be from the image being inpainted, although in many circumstances the model image and the target image to be synthesized will be from the same image.

At block 606, the second visual object is inpainted into the part of the image to be synthesized. The custom-generated target object is embedded into the image at the designated location and automatically sized and oriented for its context. A graph cut can be applied to negotiate any overlap that occurs between the newly embedded object and the pre-existing image. If this process leaves some visual seams, the seams are worked out to a pleasing visual gradient with a Poisson filter. Then, if the generated image does not entirely fill the missing area in the image, an edge filling process, which may employ another inpainting process, propagates image textures up to the border of the newly embedded object.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-executable method, comprising:
    selecting by a computing device, a first visual object to be a model for synthesizing a part of an image via object-based inpainting;
    generating a second visual object from the first visual object; wherein generating the second visual object includes geometrically matching features of the second visual object to features of the first visual object, wherein geometrically matching features includes identifying and matching a main axis of symmetry in the first and second visual objects, wherein the main axis of symmetry is identified by:
        i) calculating a weight center of a visual object;
        ii) searching a plurality of lines that pass through the weight center that separate the visual object into two partitions; and
        iii) selecting a line of the plurality of lines as the main axis of symmetry based on a length of the line of the plurality of lines and a relative position of the line of the plurality of lines; and
    inpainting the second visual object into the part of the image.

2. The computer-executable method as recited in claim 1, wherein the inpainting includes rotating and scaling features of the first visual object to establish an orientation and a size of the second visual object.

3. The computer-executable method as recited in claim 1, further comprising generating inner structure elements of the second visual object, wherein inner structure elements of the first visual object are reproduced in the second visual object according to contours of the second visual object with respect to corresponding symmetry axes of the second visual object.

4. The computer-executable method as recited in claim 1, wherein generating the second visual object includes refining a border of the second visual object via contour deformation.

5. The computer-executable method as recited in claim 4, wherein refining the border includes segmenting the border of the second visual object into two segments divided by the main symmetry axis, wherein each segment with a fraction of an entire contour is generated from a counterpart segment that has a counterpart contour in the first visual object.

6. The computer-executable method as recited in claim 1, wherein generating the second visual object includes generating texture for different areas of the second visual object, wherein a texture from the image is adopted as a model for generating texture patches used for generating the texture.

7. The computer-executable method as recited in claim 6, wherein a confidence map guides the order of generating the texture patches for the different areas of the second visual object and an availability map limits a range of candidate texture patches for generating the texture.

8. The computer-executable method as recited in claim 6, further comprising comparing a similarity of textures in the image using a sum of squared difference (SSD) of pixel values between overlapped known regions of two candidate texture patches to find the texture to be adopted as the model.

9. The computer-executable method as recited in claim 8, further comprising attenuating the SSD between two pixels by an attenuation factor when either of the pixels belong to a border of an object.

10. The computer-executable method as recited in claim 6, wherein when an area of the second visual object is small enough below a threshold value, then generating the texture includes filling in the area by interpolating pixels of the area with neighboring pixels adjacent to the area.

11. The computer-executable method as recited in claim 1, further comprising performing a graph-cut segmentation to eliminate overlaps between the second visual object and a border of the part of the image being inpainted.

12. The computer-executable method as recited in claim 11, further comprising Poisson filtering to eliminate visual seams caused by the graph-cut segmentation.

13. The computer-executable method as recited in claim 1, further comprising edge filling by propagating a structure or a texture in gaps between the second visual object and a border of the part of the image being inpainted.

14. A system, comprising:
    a coarse object construction engine for generating via a computing device, an object to embed in a part of an image to be inpainted via geometrical matching with features of a source model object; and
    a texture generator to model texture patches to apply to the object with respect to contours and symmetry axes of the object, wherein a symmetry axis of the object is identified by:
        i) calculating a weight center of an object;
        ii) searching a plurality of lines that pass through the weight center that separate the object into two partitions; and
        iii) selecting a line of the plurality of lines as the main axis of symmetry based on a length of the line of the plurality of lines and a relative position of the line of the plurality of lines.

15. The system as recited in claim 14, further comprising a border refinement engine to process a border of the object via pixel-based contour deformation.

16. The system as recited in claim 14, further comprising an environment refiner, to fit the object into the image using graph-cut segmentation, edge filling, and Poisson filtering.

17. The system as recited in claim 14, further comprising an inner structure generator to synthesize non-border visual structure within the contours of the object.

18. A computing device comprising:
    a processor; and
    a memory coupled to the processor, the memory comprising computer-program instructions executable by the processor for:
    selecting a first visual object to be a model for synthesizing a part of an image via object-based inpainting;
    generating a second visual object from the first visual object; wherein generating the second visual object includes geometrically matching features of the second visual object to features of the first visual object, wherein geometrically matching features includes identifying and matching a main axis of symmetry in the first and second visual objects, wherein the main axis of symmetry is identified by:
        i) calculating a weight center of a visual object;
        ii) searching a plurality of lines that pass through the weight center that separate the visual object into two partitions; and
        iii) selecting a line of the plurality of lines as the main axis of symmetry based on a length of the line of the plurality of lines and a relative position of the line of the plurality of lines; and
    inpainting the second visual object into the part of the image.

* * * * *